United States Patent [19]

Osada

[11] Patent Number: 4,723,899
[45] Date of Patent: Feb. 9, 1988

[54] MOLDING APPARATUS FOR ENCLOSING SEMICONDUCTOR CHIPS WITH RESIN

[76] Inventor: Michio Osada, No. 6-197, 3-chome, Myojyo-cho, Uji-shi, Kyoto-fu, Japan

[21] Appl. No.: 796,814

[22] Filed: Nov. 12, 1985

[30] Foreign Application Priority Data

Nov. 12, 1984 [JP] Japan .............................. 59-171447[u]
Jun. 19, 1985 [JP] Japan ............................... 60-92649[u]

[51] Int. Cl.⁴ ............................................... B29C 31/06
[52] U.S. Cl. .................................... 425/116; 264/40.5; 264/272.13; 425/129 R; 425/149; 425/544
[58] Field of Search ..................... 264/40.1, 40.3, 40.5, 264/272.13, 272.14, 272.17, 297.2, 297.8, 328.8; 425/146, 149, 117, 116, 120, 121, 125, 544, 557, 559, 561, 414, 129 R, 588; 29/588

[56] References Cited

U.S. PATENT DOCUMENTS

| | | | |
|---|---|---|---|
| 3,052,918 | 9/1962 | Holmes | 425/149 |
| 3,443,628 | 5/1969 | Carr | 425/149 |
| 4,347,211 | 8/1982 | Bandoh | 425/544 |
| 4,470,786 | 9/1984 | Sano et al. | 425/116 |
| 4,511,317 | 4/1985 | Bandoh | 425/116 |
| 4,599,062 | 7/1986 | Konishi | 425/116 |
| 4,632,653 | 12/1986 | Plocher | 425/149 |

FOREIGN PATENT DOCUMENTS

| | | | |
|---|---|---|---|
| 2141278 | 9/1972 | Fed. Rep. of Germany | 425/149 |
| 51-50357 | 5/1976 | Japan | 425/149 |
| 58-29640 | 2/1983 | Japan | 425/149 |
| 60-120025 | 6/1985 | Japan | 425/149 |

*Primary Examiner*—Willard E. Hoag
*Assistant Examiner*—Jill L. Fortenberry
*Attorney, Agent, or Firm*—Larson & Taylor

[57] ABSTRACT

A molding apparatus for enclosing semiconductor chips with resin has a plurality of plungers for applying pressure to a resin material, at least one transfer channel holding each of resin material supplying pots in communication with corresponding one of cavities for transferring the resin material in a molten state, a communication bore formed in the vicinity of the transfer channel in communication therewith, slide members each intimately fitting in the communication bore and slidable forward or backward, pressing-pushing members for pushing each slide member toward the corresponding transfer channel with a uniform pressure, and a pressure sensor operable by the retraction of each slide member for detecting the internal pressure of the transfer channel.

5 Claims, 7 Drawing Figures

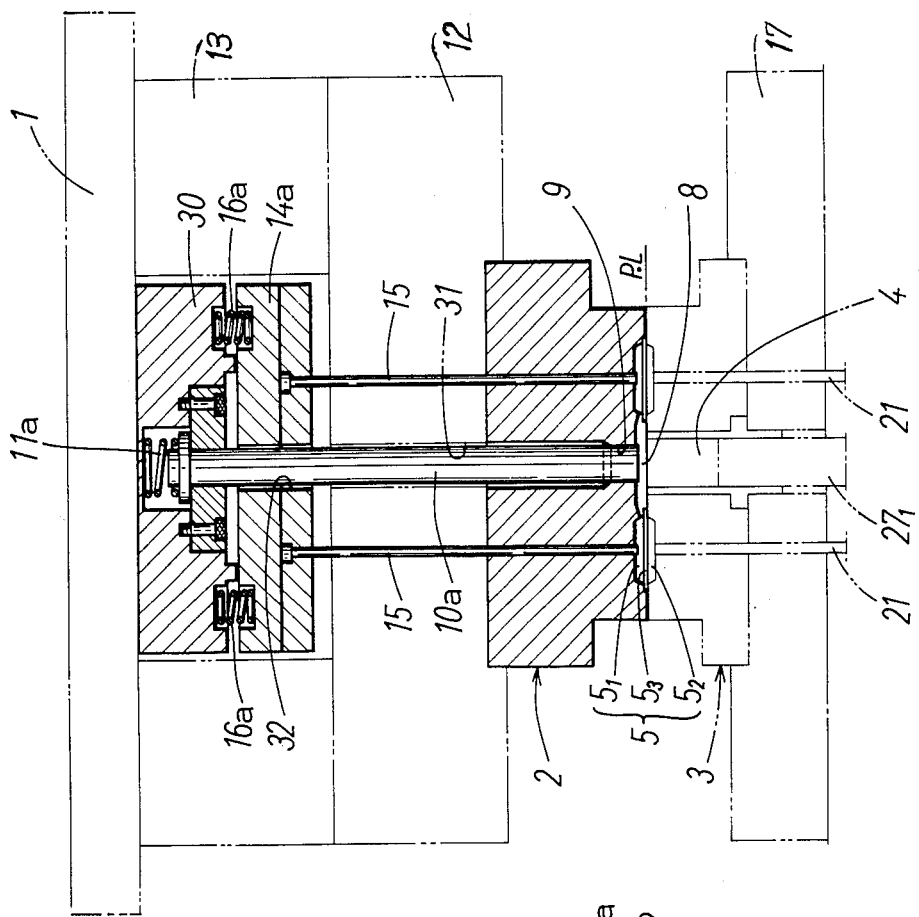
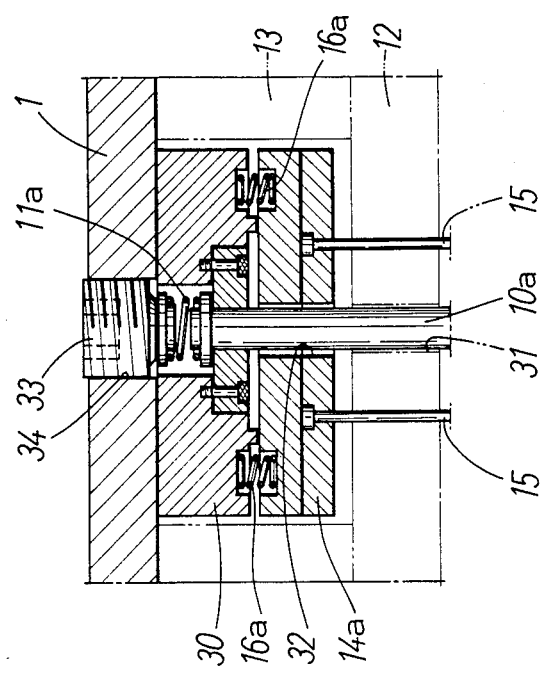

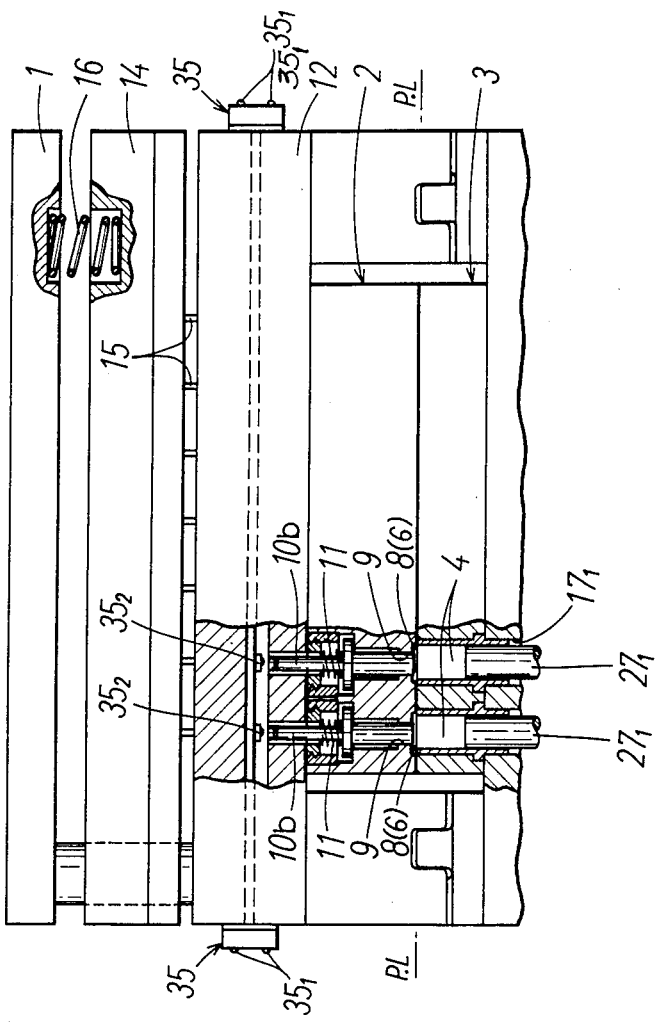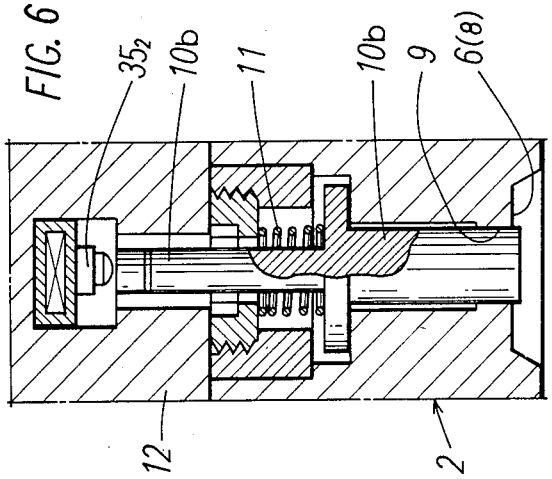

MOLDING APPARATUS FOR ENCLOSING SEMICONDUCTOR CHIPS WITH RESIN

BACKGROUND OF THE INVENTION

Molding apparatus are known in which a resin material supplied to pots of a mold is heated and pressurized to a molten state and then injected into molding cavities through transfer channels to enclose with the resin semiconductor chips on a lead frame set in position at the cavity portion.

Such molding apparatus heretofore proposed include those of the multiplunger type which have, for example, the following construction.

The molding apparatus comprises a stationary mold, a movable mold opposed to the stationary mold, a plurality of pots formed in one of these molds for supplying a resin material, a plurality of molding cavities defined by the opposed molds, channels for holding each pot in communication with the corresponding cavities to transfer the resin material in molten state, plungers corresponding to the pots in position and number for pressurizing the resin material, a drive assembly for advancing or retracting the plungers, etc.

The plungers are attached to a plunger holder which is movable forward and backward. However, when the plungers are fixed to the holder, the resin molding operation involves the following problem.

The plungers are moved forward or backward at the same time, so that if excessive or insufficient amounts of resin material are fed to some of the pots, it is impossible to subject the portions of resin material to a uniform pressure. Consequently the resin material is melted, transferred and injected into the cavities with application of pressure under varying conditions. For example, if insufficient amounts of resin material are fed to cavities, the condition for molding the resin within the cavities varies from cavity to cavity. Under such molding conditions, pinholes or voids will occur in the surface or interior of the molded resin bodies enclosing semiconductor chips, giving lower moisture resistance and reduced reliability to the product.

To eliminate the above drawback, a molding apparatus has been proposed wherein the plungers are movable forward and backward, each independently of another in accordance with the amount of resin material fed to the corresponding pot. In this case, even if an excess or deficiency occurs in the amounts of resin material fed to the cavities, the resin within the cavities can be molded under a uniform condition.

However, even if the improved molding apparatus is used, voids or like faults are likely to occur in molded resin bodies, presumably owing to the following cause.

When the resin material fed to a pot is melted with application of pressure by the plunger, the resin material partly ingresses into the clearance around the plunger in the pot, presenting difficulty to the sliding action of the plunger. Since each plunger is made movable forward or backward axially thereof independently of another in accordance with the amount of supply of the resin material, the resin material present in the clearance is likely to impede the sliding action of the plunger irrespective of the amount of supply of the resin material. Thus, even if the resin material is fed to the pot in a specified or smaller amount, the plunger, when prevented from sliding smoothly, fails to apply the desired pressure to the resin material in the pot. The pressure applied to the resin material by the plungers is not uniform, with the result that the resin material in the cavities is molded under varying conditions.

SUMMARY OF THE INVENTION

The present invention relates to a molding apparatus of the multiplunger type for enclosing semiconductor chips with resin.

The main object of the present invention is to provide a molding apparatus wherein a resin material is subjected to a uniform pressure by plungers and injected into cavities at a uniform speed to afford a molded resin product of improved quality having semiconductor chips enclosed therein.

Another object of the invention is to provide a molding apparatus which is adapted to early detect a deficiency in the resin molding pressure of plungers.

The present invention provides a molding apparatus of the multiplunger type for enclosing semiconductor chips with resin which comprises plungers fixed to a movable plunger holder, slide members each intimately fitting in a communication bore and slidingly movable forward and backward, the communication bore being formed in the vicinity of a channel for transferring a molten resin material in communication therewith, and pressing-pushing members for pushing the slide members each toward the corresponding transfer channel with a uniform pressure.

The present invention further provides a molding apparatus of the multiplunger type for enclosing semiconductor chips with resin in which a molten resin material transfer channel has a cull portion and a communication bore communicating with the cull portion and which comprises a slide member intimately fitting in the communication bore and slidingly movable backward by the pushing action of a plunger, and means operable by the sliding movement of the slide member for detecting the internal pressure of the transfer channel.

With the molding apparatus described above, semiconductor chips on a lead frame are set in position for the molding cavities, and a resin material fed to the pots is subjected to a pressure by the plungers and melted by being heated by a heater of the molds. Under the pressure applied by the plungers, the molten resin material is injected through the transfer channels into the cavities to enclose the semiconductor chips in the cavities with the resin. During the transfer of the molten resin material, the slide members arranged in the vicinity of the transfer channels are slidingly retracted in accordance with the internal pressure of the channels to adjust the internal pressure of the channels. In this way, the internal pressure of each transfer channel is adjusted. Consequently, even if varying amounts of resin material are fed to the pots or varying pressures are applied to the resin material by the plungers, the retraction of the slide members disposed in the communication bores makes the internal pressure of the transfer channels uniform. Accordingly the molten resin material can be injected through the channels into the cavities at a uniform speed, whereby the semiconductor chips in the cavities can be enclosed with molded resin under the same condition.

When the internal pressure of a transfer channel is below the specified level, the slide member provided in the vicinity of that channel will not retract or retracts to an insufficient extent. Thus, when the specified resin molding pressure is not available as afforded by the plunger, the slide member does not slide substantially, failing to actuate the pressure detecting means. This enables the operator to readily recognize that the plunger concerned fails to give the desired resin molding pressure.

According to the present invention, therefore, the molded resin bodies obtained with semiconductor chips enclosed therein are free from voids or like faults in the surface or interior, while the semiconductor chips or lead wires or bonding wires are also free from damage, with the result that the present apparatus provides molded products having a high quality and outstanding in moisture resistance, reliability, etc.

The present invention further enables the operator to early detect abnormalities such as an insufficient resin molding pressure due to enlargement of the clearance between the cavity inner surface and the plunger or some other trouble, rendering the apparatus best-suited to the manufacture of products of high quality with a high efficiency.

BRIEF DESCRIPTION OF THE DRAWINGS

FIGS. 3 to 7 show other embodiments of the invention, FIGS. 3 and 4 being fragmentary enlarged views in vertical section, FIG. 5 being a front view partly broken away, FIGS. 6 and 7 being fragmentary enlarged front views in vertical section.

DESCRIPTION OF THE PREFERRED EMBODIMENTS

Figure 1:
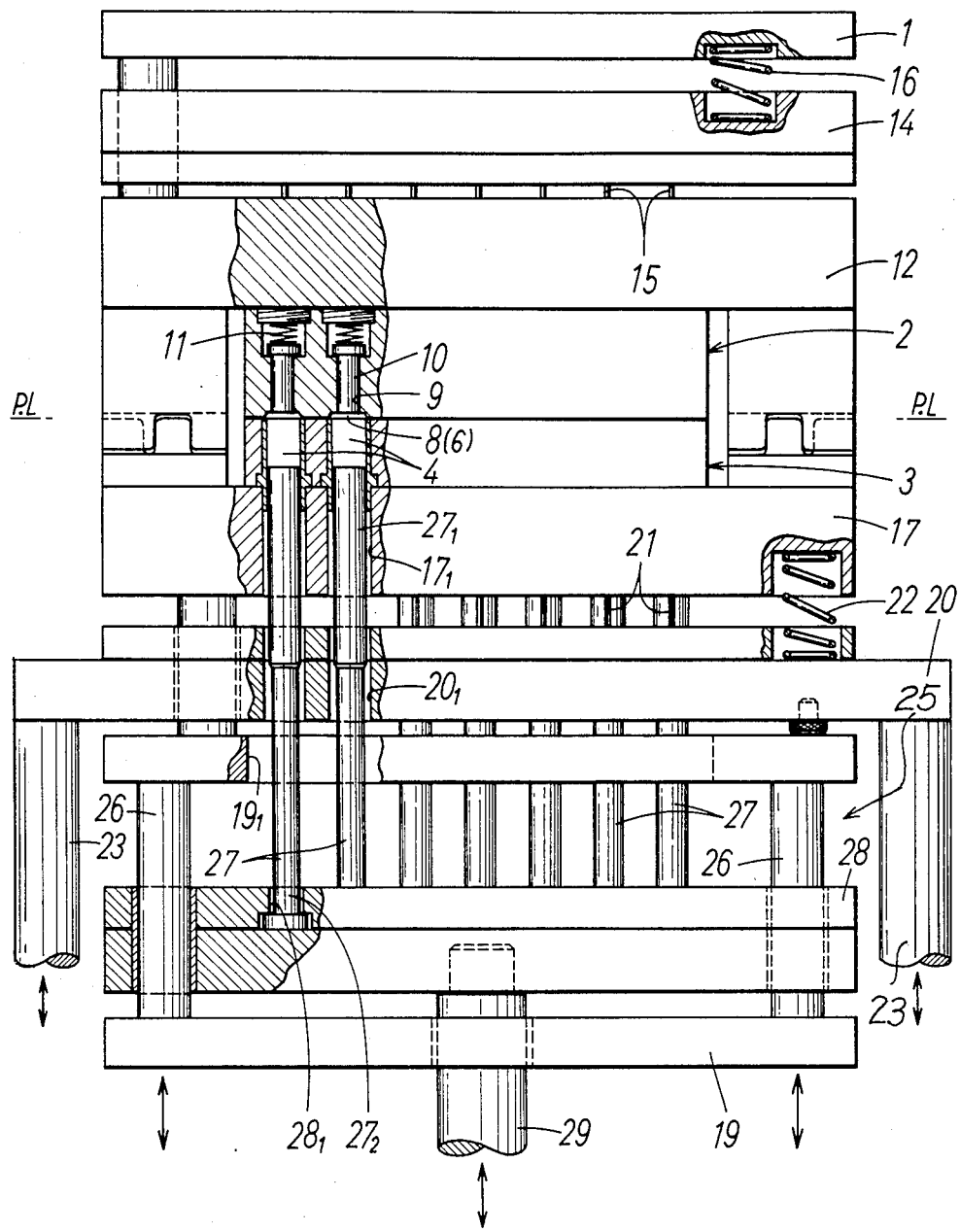
FIG. 1 is a fragmentary front view partly broken away and showing a molding apparatus embodying the present invention.
Figure 2:
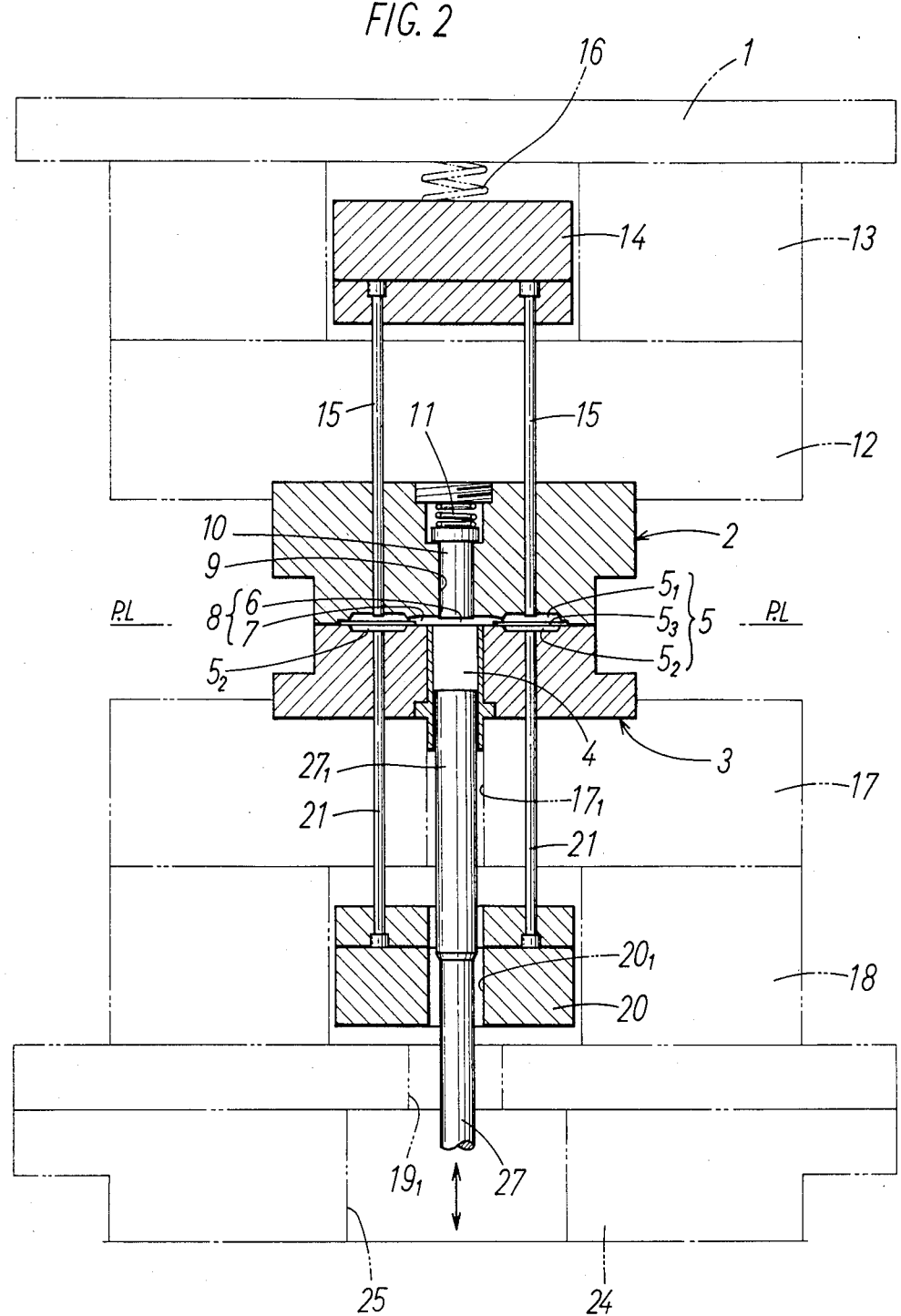
FIG. 2 is a fragmentary enlarged side elevation in vertical section showing the same.

FIGS. 1 and 2 show a molding apparatus of the present invention for enclosing semiconductor chips with resin.

The molding apparatus is of the multiplunger type and comprises a stationary plate 1 fixed to an upper portion of the frame of the apparatus, a stationary upper mold 2 fixedly provided below the stationary plate 1 and a movable lower mold 3 provided under the upper mold 2. A plurality of resin material supply pots 4 are formed in the lower mold 3. Around each pot 4, a plurality of cavities 5 are defined by the upper and lower molds 2 and 3. The pot 4 communicates with the plurality of cavities 5 through molten resin material transfer channels 8 which comprise a cull portion 6 and a gate 7. The apparatus further comprises resin material pressing plungers 27 corresponding in position and number to the pots 4, a movable plunger holder 28 having the plungers 27 fixed thereto, slide members 10 each intimately fitting in a communication bore 9 and slidingly movable forward and backward, the communication bore 9 being provided in the vicinity of the transfer channel 8 and communicating with the channel 8, and pressing-pushing members 11 for pushing the slide members 10 toward the channels 8 respectively with a uniform pressure.

The stationary upper mold 2 is fixed to the stationary plate 1 with an upper mold plate 12 and a spacer block 13 interposed therebetween. An upper ejector plate 14 is vertically movably disposed in a space provided by the spacer block 13. The ejector plate 14 is provided with ejector pins 15 for pushing out molded resin bodies from the cavity portions $5_1$ of the upper mold 2. The ejector plate 14 is upwardly retractable by return pins or like pushing-up members when the upper and lower molds 2, 3 shown in FIGS. 1 and 2 are clamped but is forced down by the action of coiled springs 16 between the ejector plate 14 and the stationary plate 1 when the molds 2, 3 are opened.

The movable lower mold 3 is fixed to a movable plate 19, with a lower mold plate 17 and a spacer block 18 provided therebetween. The movable plate 19 is vertically movable, for example, by hydraulic means. A lower ejector plate 20 is upwardly or downwardly movably provided in a space provided by the spacer block 18. The ejector plate 20 has ejector pins 21 for pushing out molded resin bodies from the cavity portions $5_2$ of the lower mold 3. The ejector plate 20 is forced down by the action of coiled springs 22 interposed between the plate 20 and the lower mold plate 17 when the molds are clamped but is pushed up by ejector bars 23 when the molds are opened.

A space 25 is provided by a spacer block 24 above the movable plate 19. Vertical guide supporters 26 extend upward from opposite ends of the movable plate 19. The holder 28 fixedly carrying the plungers 27 is vertically slidable on the guide supporters 26. Each of the plungers 27 extends through a hole $19_1$ formed in a member interconnecting the upper ends of the supporters 26, a hole $20_1$ formed in the lower ejector plate 20 and a hole $17_1$ formed in the lower mold plate and has its upper pressing end $27_1$ fitted in the corresponding pot 4. Accordingly the plungers 27 and the holder 28 are movable upward or downward at the same time by the operation of a lift member 29, for example, of hydraulic means. Preferably, the plungers 27 are fixedly mounted on the holder 28, with a clearance $28_1$ formed between the holder 28 and the peripheral surface of the base end $27_2$ of each plunger 27, because even when the difference in temperature between the lower mold assembly (having pots 4) and the holder (28) assembly exerts a force to thermally deform the plunger 27, the clearance $28_1$ can substantially absorb the external force, permitting the plunger pressing end $27_1$ in the pot 4 to move upward or downward smoothly and reliably.

The pressing-pushing members 11 are adapted to push the slide members 10 individually by the same pressure. The pressing-pushing members 11 shown in FIGS. 1 and 2 are coiled springs which are identical in spring action. These coiled springs may be replaced by hydraulic means which utilize an oil pressure, pneumatic pressure, high gas pressure or the like. The action of the pressing-pushing member on the slide member 10 may be made adjustable by a pressure adjusting bolt, valve or like member.

FIG. 3 shows another embodiment, in which a slide member 10a extends upward through an upper ejector plate 14a. Provided between the upper ejector plate 14a and an upper support plate 30 for the slide member 10a are coiled springs 16a for depressing the plate 14a. The upper mold plate 12 and the upper ejector plate 14a are formed with holes 31 and 32, respectively, for inserting the slide member 10a therethrough. The slide member 10a is pushed by a pressing-pushing member 11a toward the cull portion 6. With the exception of the above feature, this embodiment is basically identical with the embodiment of FIGS. 1 and 2.

FIG. 4 shows another embodiment, in which the pressing-pushing member 11a of the embodiment of FIG. 3 is provided with a pressure adjusting member 33 for the action of the member 11a on the slide member 10a. The stationary plate 1 above the pressing-pushing member 11a has a threaded bore 34 in which the pressure adjusting member 33 in the form of a bolt is screwed. This embodiment has the advantage that the slide member 10a can be installed in place or replaced with ease. The embodiment otherwise has basically the same construction as the one shown in FIG. 3.

FIGS. 5 and 6 show another embodiment, in which the cull portion 6 is provided with a communication bore 9 communicating with the cull portion 6, and a slide member 10b intimately fitting in the bore 9 is slidable by the pressing action of the plunger 27. The embodiment comprises means 35 operable by the sliding movement of the slide member 10b for detecting the internal pressure of the channel 8. When the resin material within each pot 4 is melted by being heated by the molds and pressed by the plunger 27 and then transferred through the channels 8 concerned toward the corresponding cavities 5, the pressure detecting means 35 detects whether the resin molding pressure is at a specified level. More specifically, when the pressure exerted by the plunger 27 on the resin material, therefore, on the slide member 10b at the cull portion 6 is not lower than the specified resin molding pressure, the slide member 10b moves upward against the pressure of the pressing-pushing member 11, closing a switch $35_2$ to turn on the corresponding one of pilot lamps $35_1$. Alternatively if the pressure is lower than the specified level, the slide member 10b is unable to move upward or moves upward insufficiently, permitting the switch $35_2$ to remain open. According to the present embodiment, therefore, an unlighted pilot lamp $35_1$, if any, readily indicates that the pressure given by the corresponding plunger 27 is lower than is desired.

The pressure detecting means 35 may be such that the sensor thereof is actuated by the sliding movement of the slide member 10b. For example, the pilot lamp $35_1$ may be turned on only in the event of abnormality, i.e., only when the specified molding pressure is not available. In the event of such an abnormality, a buzzer or the like may be adapted to go on along with the pilot lamp.

When the slide member 10b for turning on the switch $35_2$ of the pressure detecting means 35 is disposed at the cull portion 6 of the channel 8, the slide member 10b can be made diametrically equal to or larger than the plunger 27 and thereby given a wide area to be acted on by pressure. This assures the slide member 10b of a sufficient sliding action.

The pressure detecting means 35, although having an electrical construction, may be one utilizing a fluid. FIG. 7 shows such pressure detecting means 36, which is so constructed that when a slide member 10c is moved by the pressure of the plunger 27 on the resin material, the slide member 10c exerts a pressure on a fluid 37, such as oil, which in turn delivers the pressure to a pressure gauge 38. The fluid 37 can be a gas such as compressed air. In this case, the arrangement may be so designed that the slide member 10c, when moved up, causes compresssed air to flow out for the pressure gauge 38 to detect the amount of leak.

The operation of the embodiment thus constructed will be described below with reference to FIGS. 1 and 2.

First, the movable plate 19, the lower ejector plate 20 and the plunger holder 28 are moved down to open the upper and lower molds 2, 3. A resin material is then fed to the pots 4 formed in the lower mold 3. A semiconductor lead frame (not shown) is fitted in setting grooves $5_3$ formed in the cavity portions 5, with semiconductor chips (not shown) on the lead frame set in position within the upper and lower cavity portions $5_1$, $5_2$. Subsequently, the movable plate 19 is moved upward to clamp the upper and lower molds 2, 3, whereby the two molds 2, 3 are intimately joined together along the parting line P.L. Consequently, each pot 4 is held in communication with the corresponding channels 8 and cavities 5 as seen in FIGS. 1 and 2.

On completion of clamping, the plunger holder 28 is raised, whereby the resin material portions within the pots 4 are subjected to a pressure at the same time by the plungers 27 fixed to the holder 28 and melted by the heater heating the molds to a predetermined temperature. Under the pressure applied by the plungers 27, the molten resin material is injected into the cavities 5 via the channels 8. Upon lapse of a predetermined period of time, the semiconductor chips within the cavities 5 are enclosed in molded resin bodies.

When the molds are clamped, the lower ejector pins 21 are held in a lowered position by the plate 20, while the upper ejector pins 15 are held in a raised position by being pushed up by the plate 14. Accordingly, the upper and lower ejector pins 15, 21 are held retracted from the upper and lower cavity portions $5_1$, $5_2$, respectively, when the molds are clamped together, permitting the molds to define the desired cavities 5. However, when the upper and lower molds 2, 3 are opened, the upper ejector pins 15 are forced into the upper cavity portions $5_1$ by the action of the coiled springs 16, while the lower ejector pins 21 are forced into the lower cavity portions $5_2$ by the lower ejector plate 20 which is moved up when the molds are opened. After the molding operation, therefore, the semiconductor lead frame and a molded resin body solidified within the cavities 5 and the channels 8 are released into the space between the opened upper and lower molds 2, 3.

When equal amounts of resin material are fed to the pots 4, the molten resin material can be transferred and injected into the cavities 5 with the same timing and at a uniform speed, with the result that the semiconductor chips can be enclosed with molded resin under identical conditions.

With the embodiment described, the slide members 10 fitting in the bores 9 communicating with the channels 8 are individually subjected to a uniform pressure of the pressing-pushing members 11 and are therefore individually retractably away (upward) from the channels 8 in accordance with the molding pressure of the plungers 27, permitting a uniform pressure to act on the molten resin material within the channels 8. This stabilizes the speed of transfer of the molten resin material to the cavities 5 and permits injection of the transferred material into the cavities with the same timing at a uniform speed.

The plungers 27 are fixed to the plunger holder 28 and are moved upward or downward at the same time by the lift means 29.

Accordingly, if equal amounts of resin material are fed to the pots 4, the resin portions are melted at the same time while being subjected to the pressure of the plungers 27, while the molten resin material is transferred and injected into the cavities under uniform conditions, with the result that the semiconductor chips can be enclosed with molded resin under the same conditions.

If the amounts of resin material fed to the pots 4 are not equal, the resin portions are subjected to the pressure of the plungers 27 and melted under varying conditions in accordance with the amounts. Nevertheless, even in this case, the molten resin material is transferred and injected into the cavities 5 under uniform conditions by virtue of the provision of the slide members 10 and the pressing-pushing members 11. This assures that the semiconductor chips will be enclosed with molded resin under identical conditions.

Thus, the present invention ensures uniform resin enclosing-molding conditions to provide a molded product free from voids in its interior or surface although such faults could result, for example, when the cavities 5 are not fully charged with the resin material. Further if the resin material is injected into the cavities under an excessive pressure (or at an exceedingly high speed), the lead wire would deform or break, but such defects are effectively avoidable according to the present invention. Thus, the molded resin product having semiconductor chips enclosed therein obtained by the invention has a high quality and is excellent in moisture resistance and reliability.

Further when the desired resin molding pressure is not available owing to an enlarged clearance between the pot-defining inner surface and the plunger due to wear or some other trouble, such an abnormality can be detected by the pressure detecting means early and reliably. Thus, the invention provides a molded resin product of high quality having semiconductor chips enclosed therein and a molding apparatus suited to efficient manufacture of such product.

Although the present invention has been described above with reference to preferred embodiments, these embodiments are given for illustrative purposes only and are in no way limitative. Accordingly, various modifications and alterations can be made without departing from the scope of the invention as defined in the appended claims.

What is claimed is:

1. A molding apparatus of the multiplunger type including a stationary mold, a movable mold opposed to the stationary mold, a plurality of pots formed in one of the molds for supplying a resin material, a plurality of cavities defined by the molds, at least one transfer channel holding each of the pots in communication with the corresponding cavity for transferring the resin material in a molten state, and plungers corresponding to the pots in position and number for applying a pressure to the resin material, the molding apparatus comprising a movable plunger holder having the plungers fixed thereto, slide members each intimately fitting in a communication bore and slidingly movable forward and backward, the communication bore being in communication with the transfer channel, pressing-pushing means in contact with said slide members for pushing the slide members each toward the corresponding transfer channel with a pressure sufficient to maintain the sliding members in a freely movable position at a specified molding pressure such that during injection the sliding members are freely movable forward and backward in response to variations from the specified molding pressure, and pressure detecting means actuatable by the sliding movement of the slide member for detecting the internal pressure of the transfer channel.

2. A molding apparatus as defined in claim 1 wherein the communication bore communicates with the transfer channel at the position of a cull portion of the transfer channel.

3. A molding apparatus as defined in claim 1 wherein a pressure adjusting member is provided for adjusting the action of the pressing-pushing member on the slide member.

4. A molding apparatus as defined in claim 1 wherein the pressure detecting means is electrically turned on or off by the sliding action of the slide member.

5. A molding apparatus as defined in claim 1 wherein the sliding members do not prevent communication of moldable material between the pot and the transfer channel.

* * * * *